A. DE VILBISS, Jr.
COMPUTING SCALE.
APPLICATION FILED MAY 24, 1906.
1,223,370.
Patented Apr. 24, 1917.
3 SHEETS—SHEET 1.
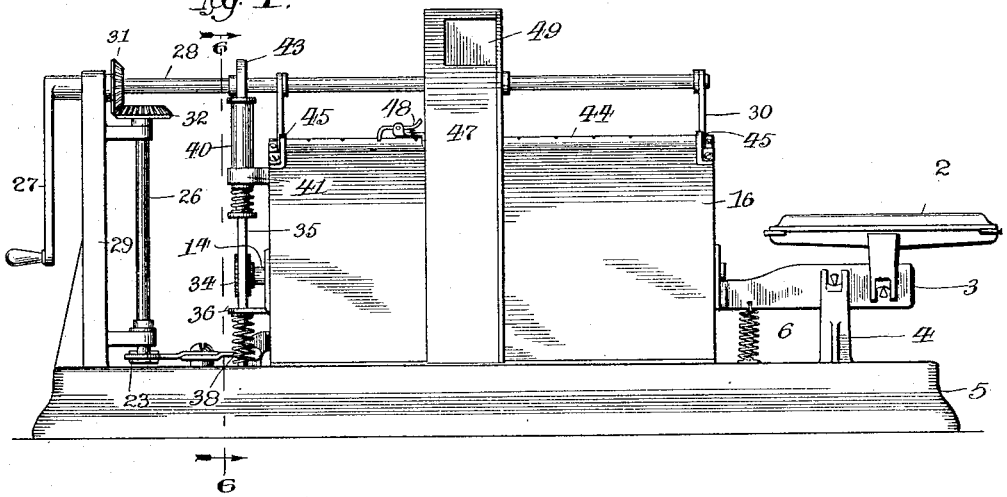
Witnesses:
Louis B. Erwin
Robert Dobberman
Inventor:
Allen DeVilbiss Jr.
by Rector Hibben & Davis
Attys.

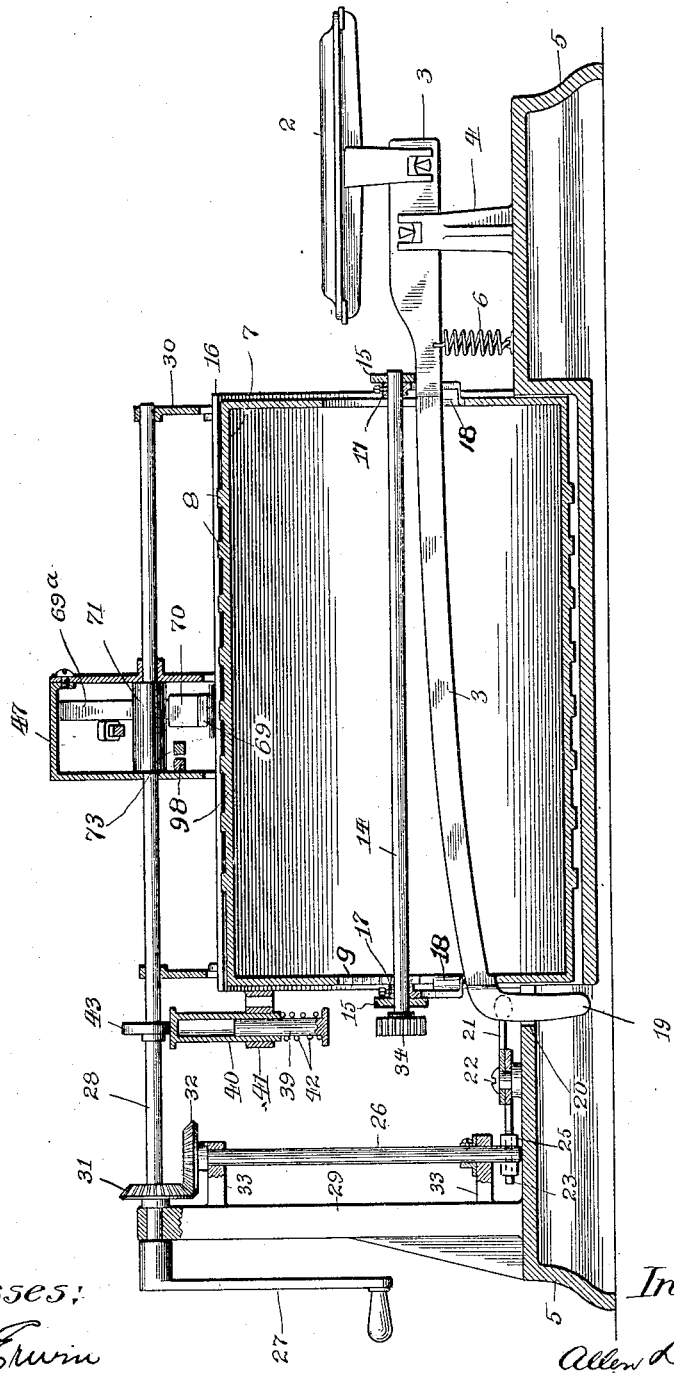

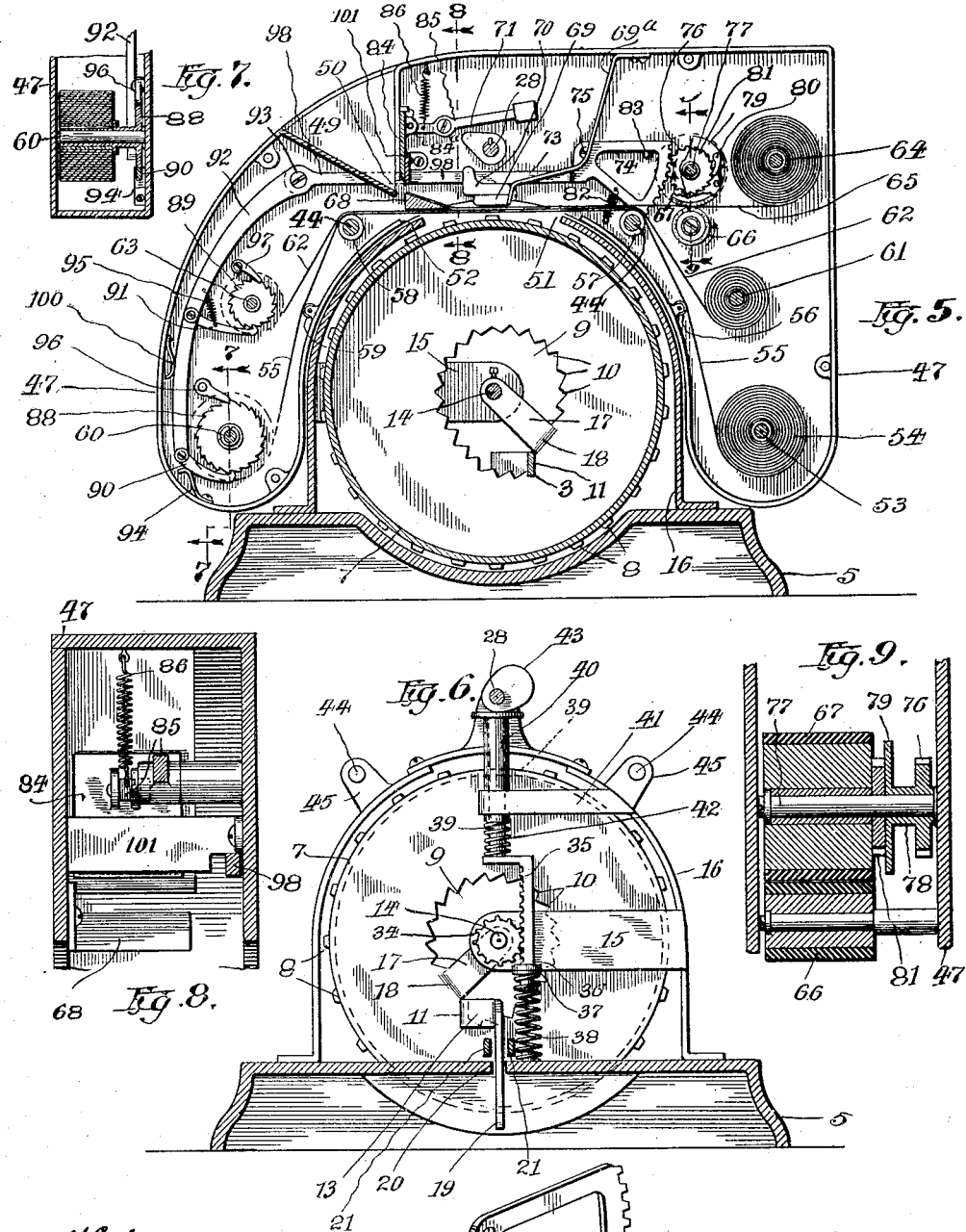

UNITED STATES PATENT OFFICE.

ALLEN DE VILBISS, JR., OF TOLEDO, OHIO, ASSIGNOR, BY MESNE ASSIGNMENTS, TO TOLEDO SCALE COMPANY, OF NEWARK, NEW JERSEY, A CORPORATION OF NEW JERSEY.

COMPUTING-SCALE.

1,223,370.     Specification of Letters Patent.     Patented Apr. 24, 1917.

Application filed May 24, 1906. Serial No. 318,540.

*To all whom it may concern:*

Be it known that I, ALLEN DE VILBISS, Jr., residing at Toledo, in the county of Lucas and State of Ohio, have invented certain new and useful Improvements in Computing-Scales, of which the following is a specification.

The present invention relates to combined weighing and sales-recording apparatus and the object generally stated is to provide, through combined weighing and price determining movements or adjustments, for making a permanent record of computations of weight and price per unit of weight. More specifically stated the invention aims to combine with the poise member of so-called "automatic" weighing scales, recording mechanism comprising a differentially movable member whose position in operation of the apparatus will be determined by the position which the poise member of the scales assumes in obedience to the weight of the article or commodity being weighed, said mechanism also comprising means for preliminarily effecting an adjustment according to the price per unit of weight. One purpose in view is to provide for recording the computations upon a continuous strip of paper contained within the machine for the purpose of preserving a complete record of transactions in the order in which they take place, and to duplicate the record of each transaction upon checks, a separate one of which issues from the machine for each transaction. Such checks are preferably severed from a second strip of paper so that in the present form of embodiment of the invention feed mechanism for a check strip as well as feed mechanism for a record strip is involved and also mechanism for severing the check strip.

With an apparatus of this character it is not necessary to rely upon the transitory indication of price computations as in ordinary computing scales and the usual index for pointing to the computation while the article or commodity rests upon the platform or scale pan, can be entirely dispensed with, the printed checks serving to show the customer the price computation which has been automatically made by the machine. At the same time a permanent connected record of all computations is preserved for the use of the proprietor so that the machine serves the purpose of a cash recorder as well as of computing scales.

Having in view the above stated and incidental objects the invention consists in certain novel features of construction and combinations of parts, the essential elements whereof are recited in the appended claims and a preferred form of embodiment of which is described in detail hereinafter and fully illustrated in the accompanying drawings.

Of said drawings Figure 1 represents the apparatus in elevation as viewed from the side opposite that where the operator would ordinarily be stationed; Fig. 2 represents the apparatus in top plan view; Fig. 3 represents in top plan view on an enlarged scale as compared with Figs. 1 and 2, a clamping device for fixing the position of the scale beam during a recording operation; Fig. 4 represents the apparatus in central longitudinal section with the parts in normal position; Fig. 5 represents the apparatus in cross-section on the line 5—5 of Fig. 2 looking in the direction of the arrows crossing said line; Fig. 6 represents the apparatus in cross-section on the line 6—6 of Fig. 1 looking in the direction of the arrows crossing said line; Fig. 7 represents a vertical longitudinal section of record strip feeding mechanism taken on the line 7—7 of Fig. 5 looking in the direction of the arrows crossing said line; Fig. 8 represents a vertical longitudinal section of check strip severing mechanism taken on the line 8—8 of Fig. 5 looking in the direction of the arrows crossing said line; Fig. 9 represents a vertical longitudinal section of check strip feeding mechanism taken on the line 9—9 of Fig. 5 looking in the direction of the arrows crossing said line; and Fig. 10 represents a detail in perspective of an actuating segment for said check strip feeding mechanism.

In said drawings like reference characters are employed to designate corresponding parts in all the figures and the reference numeral 2 designates the scale pan which is suitably mounted upon a scale beam 3 to one side of the fulcrum of the latter which fulcrum is provided in a standard 4 rising from the base 5 of the apparatus. A spring 6 connects said scale beam on the opposite side of the fulcrum with said base 5 and constitutes, together with the weight of the scale beam, counterbalancing means for the scale pan. On this side of its fulcrum the scale beam is elongated to extend longitudinally through a drum 7 which carries upon its peripheral surface type 8 in a circumferential series of axially extending rows, the type of each row representing computations increasing by units of weight according to a certain price per unit of weight. This applies to the axial or longitudinal order of type. Circumferentially the type represent computations varying per unit of weight. It will be seen therefore that by rotating the drum to an extent regulated by the weight of an article or commodity upon the scale pan a longitudinal row of its type may be presented at a certain position so that the computation can be determined by axial adjustment of means coöperating with the cylinder to take an imprint from the type thereon.

For the purpose of determining the position under rotation of said cylinder by the scale beam the head or end of the cylinder most remote from the fulcrum of the scale beam is formed with an enlarged opening 9, where said beam passes through it, of general snail-like contour. The confines of this opening are thus made to vary in uniform gradation as to radial distance from the center of rotation of the drum. It will thus be seen that by providing for the rotation of the drum to be limited by abutment of the edge of this opening against the scale beam the position of the drum can be regulated by the weight of the article or commodity because thereby the position of the scale beam with radial relation to the drum is determined.

In order to render positive the abutment of the edge or wall of this opening 9 against said scale beam this edge or wall is shouldered or stepped as shown at 10 in Figs. 5 and 6 and these different steps or shoulders correspond with the different longitudinal rows of type on the surface of the cylinder so that that particular longitudinal row of such type will be brought to the printing position which corresponds with the shoulder or step abutting against the scale beam when the drum is rotated through the instrumentalities hereinafter described. In order to take advantage of the full circumference of the drum the stepped edge or wall of the opening 9 is carried beyond the vertical diametrical line of the drum as the latter stands normally so that the divergent part of said stepped wall terminates at a tangential shoulder 11 somewhat beyond such diametrical line. The abutment of this tangential shoulder 11 against the scale beam determines the zero or negligible position of the drum. The position of the scale pan is central with reference to the axis of the drum and the scale beam extends centrally below the scale pan and hence the above described formation of the snail-like opening in the drum-head necessitates an off-set in the scale beam in order to cause the same to constitute an abutment for the drum in its zero position. The scale beam is thus off-set at 12 as shown in Fig. 2 just beyond the end journal of the cylinder and again at 13 just beyond the opposite head or end of the cylinder. The latter is supported on a shaft 14 journaled in bearings at the inner ends or arms 15 of the inclosing casing 16. The connection between the edge of the opening 9 and the said shaft 14 is effected by means of a radial arm 17 springing from said edge between the tangential shoulder 11 thereof and the converging termination of the series of steps or shoulders 10, this arm 17 being off-set at 18 to provide for the rise of the scale beam on the inner side thereof. The arm 17 is pinned to the shaft 14 through a suitable hub as shown in Fig. 4 and at its opposite end the cylinder is similarly secured to said shaft, the head of the cylinder at this opposite end being sufficiently open to permit of the necessary vibration of the scale beam where it passes through said head.

It is highly desirable in order to insure accuracy that the scale beam be fixed in the position to which it is brought by the weight of the article or commodity being weighed and hence means are provided for clamping it in position at the outset of a recording operation and maintaining the beam so clamped throughout such operation. To this end the scale beam is formed with a downward extension or tail-piece 19 beyond the off-set portion 13, the base 5 being slotted as at 20 to accommodate this extension or tailpiece. The latter extends between a pair of clamping jaws 21 pivoted at 22 upon the base 5 and formed with operating arms 23 beyond the pivot and crossing thereat, said arms being connected by a retractile spring 24 so that the jaws will be opened thereby. The rear ends of the arms 23 are curved and between the curved portions is a blade 25 carried by the lower end of a shaft or spindle 26. This blade is designed to act as a spreader upon the curved parts of the arms 23 whereby to close the jaws 21 upon the scale beam extension 19 against the stress of the spring 24. The purpose of curving the arms 23 is to provide surfaces over which the end edges of the blade or spreader can travel while maintaining the clamp. When said blade or spreader lies parallel with the arms 23 the jaws 21 are of course open and the scale beam free to vibrate but when the spindle or shaft 26 is turned this blade or spreader immediately acts to clamp the jaws upon the scale beam extension. The turning of said shaft or spindle is effected by the rotation of a crank-handle 27 upon the end of a horizontal shaft 28 journaled in uprights, one of which, 29, rises from the base 5 and the other of which, 30, rises from the casing 16. This shaft carries a beveled gear 31 which meshes with a similar gear 32 on the upper end of the shaft 26, the latter being journaled in brackets 33 projecting from the standard 29.

The rotation of the shaft 28 by the crank-handle 27, besides operating the clamping spreader, performs the function of rotating the drum 7 to position it according to the rise of the scale beam caused by the weight of an article or commodity being weighed. This further function of the shaft 28 is carried out through the following described instrumentalities. One end of the drum journal 14 is extended beyond the drum-head and carries a spur-gear or pinion 34 wherewith meshes a vertical rack 35 which at its lower end slides through a guiding lug 36 on one of the casing arms 15. Below this guiding lug said rack carries a collar 37 resting upon one end of a spiral spring 38 which in turn bears upon the base 5 surrounding a retaining lug thereon. The upper end of the rack 35 is secured to a rod or stem 39 which slides in a tubular plunger 40 which is in turn slidingly mounted in the end of an arm 41 projecting inwardly from the casing 16. A spiral spring 42 surounds the stem 39 between the rack 35 and the lower end of the tubular plunger 40 holding the latter normally elevated. The shaft 28 carries a cam 43 against which the head of the plunger 40 bears. In the first part of the rotation of the shaft 28 by its crank handle 27 the cam 43 acts upon the plunger 40 to depress the rack 35 and thereby rotate the drum 7 until it is stopped by one of the shoulders or steps 10 coming against the scale beam. The spring 42 is sufficiently stronger than the spring 38 to overpower the latter in this operation but of course when the drum is stopped by the scale beam said spring 42 will yield. The relation of the cam 43 and the head of the plunger 40 is such that after the rack has been depressed in the manner described it will be so held during further rotation of the shaft 28, such further rotation causing the printing operation which of course must take place while the drum is held in its proper weight adjustment.

Passing now to the means for taking an impression from the type on the drum reference numeral 44 designates two parallel guide rods supported in ears 45 upon the casing 16, said rods being notched in their upper sides as shown at 46 to correspond with gradations of prices per unit of weight. Mounted to slide upon these rods is a casing 47 carrying pivoted spring catches 48 to engage the notches of said guide rods. Within this casing 47 are contained paper and ink ribbon carrying, feeding, and impression devices; also check severing means; and the casing is formed with a reëntrant portion 49 through an opening 50 in the base of which the checks issue as shown in Fig. 5. The fixed casing 16 heretofore mentioned has a central longitudinal opening 51 in its top and the movable casing 47 has a similar opening 52 in its underside, these two registering openings being of sufficient extent to provide for the taking of impressions from the type on the drum through the medium of devices contained within the casing 47. Mounted in the rear lower part of the latter is a spindle 53 supporting a roll of paper 54 from which the record strip 55 is unwound, said strip passing from said roll over guide rollers 56, 57, 58 and 59 to the front side of the casing where it is wound upon a receiving spindle 60. Above the spindle 53 the casing supports another spindle 61 from which an inking ribbon 62 is unwound, said ribbon passing above the record strip 55 over the guide rollers 57 and 58 to a take-up spindle 63 in the front part of the casing. Above the spindle 61 there is contained within the casing another spindle 64 supporting a roll of paper from which the check strip 65 unwinds, said strip passing between rubber-faced feed rollers 66 and 67 and thence above the ink ribbon 62 over the guide roller 57 and thence over the inclined face of a cutter block 68 and into the opening 50 of the reëntrant portion 49 of the casing 47. The inking ribbon is of a character to print on both sides and it will be seen that the above described arrangement provides for presenting both the record strip and the check strip to the type on the drum in such manner as to receive printed impressions therefrom by pressing the paper strips and inking ribbon against the type. Of course the printing will be reversed on the side of the record strip adjacent the ink ribbon but this record strip will be of such composition as to cause the printing to show through from the opposite side. The impression means comprise a platen 69 supported by a resilient arm 69$^a$ secured to the upper side of the casing 17, a cam 70 mounted on the back of the platen and a coöperating cam 71 splined upon the shaft 28. The relation of the cams 70 and 71 is such that a certain degree of rotation of the shaft 28 may ensue without any effect upon the platen 69, this being necessary in order to provide for the proper positioning of the drum before an impression is taken. As soon as the drum has been so positioned the cam 71 acting upon the raised portion of the cam 70 will force the platen 69 against the check strip 65 and the latter, together with the ink ribbon and the record strip 55 will be pressed between the platen and the type.

The feeding of the record strip 55 and the inking ribbon 52 takes place subsequent to the printing and is effected through the following means. The take-up spindles 60 and 63 carry ratchets 88 and 89 which are engaged by operating pawls 90 and 91 pivoted to the depending arm 92 of a lever pivoted at 93 to the casing. Suitable springs 94 and 95 hold said pawls in engagement with the ratchets so that vibration of the lever arm 92 will cause intermittent turning of the take-up spindles and consequently step by step advance of the record strip and the inking ribbon. Stop pawls 96 and 97 engage the ratchets 88 and 89, respectively, to prevent backward movement of the take-up spindles. The rear arm 98 of the aforesaid lever extends below the cam 71 which is elongated for the purpose (Fig. 4) so that in the rotation of the shaft 28 this arm of the lever 98 will be depressed and consequently the other arm 92 of said lever moved outwardly thereby rotating the take-up spindles 60 and 63. A suitable spring will be employed as shown at 100 in Fig. 5 to return the lever to normal position after the cam has passed.

The feeding of the check strip is effected by means of the elongated cam 71 which operates upon an arm 73 of a segment 74 pivoted at 75 to the casing and meshing with a pinion 76 loosely mounted upon the supporting stud 77 of the feed roller 67, said arm 73 laterally overlapping the arm 98. Said pinion 76 is compounded through the medium of a sleeve 78 with a disk 79 carrying a pawl 80 spring-pressed into engagement with a ratchet-wheel 81 secured on one end of said roller 67 as indicated in Figs. 5 and 9. A spring 82 connects the segment 74 with the casing and tends to draw said segment in a direction to rotate the gear-wheel or pinion 76 in such manner as to carry the pawl 80 back over the ratchet 81. The advance of the check strip takes place after the printing has been done so that the check may be cut from the printed portion of the strip. Therefore the cam 71 does not act upon the arm 73 until it has passed the high part of the cam 70. The depression of said arm 73 which then takes place results, through the devices described, in rotating the feed roller 67 in a direction to advance the check-strip. This cam then passes on beyond said arm 73 and the spring 82 restores the segment 74 to its normal position resting against a stop pin 83.

The severing of the check-strip takes place after the strip has been fed forward so that the printed portion comes beyond the severing devices. These comprise the cutting block 68 heretofore mentioned and a sliding knife 84 working in a suitable guide 101 on the interior of the casing and adapted to coöperate with said cutting block to sever the strip. This sliding knife 84 is jointed to the front end of a lever 85 and normally maintained in an elevated position by a spring 86 connecting said arm of the lever with the casing and holding the said knife against a stop projection 84ª thereon. The rear arm of this lever extends over the elongated cam 71 which elevates said rear arm of the lever at the proper time and thereby carries the sliding knife 84 downwardly past the front side of the block 68.

The operation of the above described apparatus will be more or less apparent from what has already been set forth in this regard in the course of the description. To recapitulate in general the article or commodity whose selling price is to be ascertained, having been placed upon the scale pan 2 and the scale beam having taken up its position as determined by the weight of such article or commodity, the crank-handle 27 is rotated and the scale beam is first clamped in position; then the drum is rotated until stopped by said scale beam whereupon the platen 69 is operated to press the check and record strips together with the inking ribbon between it and the type, the casing 47 having previously been adjusted along the guide rods 46 to the proper position for the price per unit of weight at which the article or commodity is to be sold. The advance of the record strip to receive the fresh imprint and likewise the advance of the inking ribbon to present a fresh portion thereof takes place just prior to the printing action of the platen. The check strip, however, has already been fed forward in the previous transaction when the previous check was ejected. Hence there is no feed of the check strip until after the impression has been made, then this strip is advanced past the platen and over the cutter block 68 until the printed impression has passed outwardly by the cutting line, whereupon the knife 84 descends and severs the strip to provide the check for the customer.

While the above described construction will be seen to be well calculated to fulfil the objects primarily stated it is nevertheless obvious that the invention is capable of embodiment in various forms involving more or less modification of and departure from the form of embodiment here illustrated and described. Hence the claims which follow are drawn to recite essential elements without limitation to specific constructions of the parts.

What is claimed is:

1. A computing recording scale comprising a differentially-movable type-carrying member, means for moving the same, a member operated by the weight on the scale for determining extent of movement of the type-carrying member and a platen member manually adjustable as to its point of coöperation with the type-carrying member.

2. A scale having a member whose position is controlled by the weight on the scale, a computation recording mechanism comprising a printing couple one member of which is a differentially movable type carrying member whose extent of movement is determined by the weight controlled member, and the other member of the printing couple manually adjustable as to its point of coöperation with the type carrying member according to the price per unit of weight, and means operated independently of the weight on the scale for moving the differentially movable member.

3. A scale having a member whose position is controlled by the weight on the scale, computation recording mechanism comprising a printing couple one member of which is a differentially movable type carrying drum whose extent of rotation is determined by the weight controlled member, the other member of the printing couple being adjustable longitudinally of the drum according to price per unit of weight, and means for rotating the drum.

4. The combination with the scale beam of a computing weighing scale of computation recording mechanism comprising two coöperating members of which one is a differentially movable member whose ultimate position is determined by the position of the scale beam, and the other member is manually adjustable as to the point of coöperation with said differentially movable member, and means operated independently of the load on the scale for moving the differentially movable member.

5. The combination with the scale beam of a computing weighing scale, of computation recording mechanism comprising a printing couple one member of which is a differentially movable type carrying member whose extent of movement is determined by the position of said scale beam, and the other member of the printing couple manually adjustable as to its position with reference to the type carrying member, and means operated independently of the load on the scale for moving the type carrying member.

6. The combination with a scale beam of a computing weighing scale of computation recording mechanism comprising a printing couple one member of which is a differentially movable type carrying drum whose ultimate position is determined by the position of the scale beam, and the other member of which printing couple is adjustable as to its coöperating position longitudinally of the drum, and means for rotating the drum.

7. A scale having a member whose position is controlled by the weight on the scale, means for holding said member fixed, a computation recording mechanism comprising two coöperating members of which one is a differentially movable type carrying member whose ultimate position is determined by the position of the weight controlled member, and the other of which coöperating members is selectively controllable as to its point of coöperation with the said differentially movable member, and means operated independently of the load on the scale for moving the differentially movable member.

8. A scale having a member whose position is controlled by the weight on the scale, means for holding said member fixed, a computation recording mechanism comprising a printing couple one member of which is a differentially movable type carrying member whose extent of movement is determined by the weight controlled member, and the other member of the printing couple manually adjustable as to its point of coöperation with the type carrying member according to the price per unit of weight, and means for moving the differentially movable member.

9. A scale having a member whose position is controlled by the weight on the scale, means for holding said member fixed, computation recording mechanism comprising a printing couple one member of which is a differentially movable type carrying drum whose extent of rotation is determined by the weight controlled member, the other member of the printing couple being adjustable longitudinally of the drum according to price per unit of weight, and means for rotating the drum.

10. The combination with the scale beam of a computing weighing scale, means for holding the beam in fixed position, computation recording mechanism comprising two coöperating members of which one is a differentially movable member whose ultimate position is determined by the position of the scale beam, and the other member is manually adjustable as to the point of coöperation with said differentially movable member, and means for moving the differentially movable member.

11. The combination with the scale beam of a computing weighing scale, means for holding the beam in fixed position, computation recording mechanism comprising a printing couple one member of which is a differentially movable type carrying member whose extent of movement is determined by the position of said scale beam, and the other member of the printing couple manually adjustable axially of the type-carrying member as to its position with reference to the type carrying member, and means for moving the type carrying member.

12. The combination with a scale beam of a computing weighing scale, means for holding the beam in fixed position, of computation recording mechanism comprising a printing couple one member of which is a differentially movable type carrying drum whose ultimate position is determined by the position of the scale beam, and the other member of which printing couple is adjustable, as to its coöperating position, longitudinally of the drum, and means for rotating the drum.

13. A scale having a member whose position is controlled by the weight on the scale, means for clamping said member, a computation recording mechanism comprising two coöperating members of which one is a differentially movable type carrying member whose ultimate position is determined by the position of the weight controlled member and the other of which coöperating members is manually adjustable as to its point of coöperation with the said differentially movable member, and means for moving the differential member.

14. A scale having a member whose position is controlled by the weight on the scale, means for clamping said member, a computation recording mechanism comprising a printing couple one member of which is a differentially movable type carrying member whose extent of movement is determined by the weight controlled member, and the other member of the printing couple manually adjustable as to its point of coöperation with the type carrying member according to the price per unit of weight, and means for moving the differentially movable member.

15. A scale having a member whose position is controlled by the weight on the scale, means for clamping said member, computation recording mechanism comprising a printing couple one member of which is a differentially movable type carrying drum whose extent of rotation is determined by the weight controlled member, the other member of the printing couple being adjustable longitudinally of the drum according to price per unit of weight, and means for rotating the drum.

16. The combination with the scale beam of a computing weighing scale, means for clamping the scale beam, computation recording mechanism comprising two coöperating members of which one is a differentially movable member whose ultimate position is determined by the position of the scale beam, and the other member is manually adjustable as to the point of coöperation with said differentially movable member, and means for moving the differentially movable member.

17. The combination with a scale beam of a computing weighing scale, means for clamping the scale beam, computation recording mechanism comprising a printing couple one member of which is a differentially movable type carrying drum whose ultimate position is determined by the position of the scale beam, and the other member of which printing couple is adjustable as to its coöperating position longitudinally of the drum, and means for rotating the drum.

18. In a weighing scale the combination with a member whose position is controlled by the weight on the scale, of computation recording mechanism comprising two coöperating members one of which is a differentially movable member having a graduated contact surface to abut said weight controlled member in its varying positions, and the other of which coöperating members is adjustable along said differentially movable member as to its point of coöperation therewith according to the price per unit of weight, and means for moving the differentially movable member.

19. A scale having a member whose position is controlled by the weight on the scale, a printing couple comprising a differentially movable type-carrying member having a graduated contact surface to abut said weight-controlled member in its varying positions and a member coöperating with the type of the differentially movable member and adjustable according to the price per pound with reference to said type-carrying member and means for moving the latter.

20. A scale having a member whose position is controlled by the weight upon the scale pan, a printing couple, one member of which is a differentially movable type-carrying drum having a graduated contact surface to abut said weight-controlled member and thereby limit the movement of the drum, the other member of the printing couple being adjustable along the drum according to the price per pound of the article being weighed and means for moving the drum.

21. The combination, with the scale beam, of a computing weighing scale, of a computing recording mechanism comprising a differentially movable member having a graduated contact surface to abut said scale beam and thereby limit the movement of said member and a coöperating member adjustable to various positions along the differentially movable member according to the price per pound of the article being weighed and means for moving said differential member.

22. The combination, with the scale beam, of a computing weighing scale, of a printing couple comprising a differentially rotatable type-carrying drum having a graduated contact surface to abut said scale beam in its varying positions and a coöperating member adjustable longitudinally of the drum and means for rotating the drum.

23. A scale having a member whose position is controlled by the weight on the scale, a printing couple comprising a differentially movable type-carrying member having a graduated stepped contact surface to abut said weight-controlled member in its varying positions and a member coöperating with the type of the differentially movable member and adjustable according to the price per pound with reference to said type-carrying member and means for moving the latter.

24. A scale having a member whose position is controlled by the weight upon the scale pan, a printing couple, one member of which is a differentially movable type-carrying drum having a graduated stepped contact surface to abut said weight-controlled member and thereby limit the movement of the drum, the other member of the printing couple being adjustable along the drum according to the price per pound of the article being weighed and means for moving the drum.

25. The combination, with the scale beam, of a computing weighing scale, of a computing recording mechanism comprising a differentially movable member having a graduated stepped contact surface to abut said scale beam and thereby limit the movement of said member and a coöperating member adjustable to various positions along the differentially movable member according to the price per pound of the article being weighed and means for moving said differential member.

26. The combination, with the scale beam of a computing weighing scale, of a printing couple comprising a differentially rotatable type-carrying drum having a graduated stepped contact surface to abut said scale beam in its varying positions and a coöperating member adjustable longitudinally of the drum and means for rotating the drum.

27. In a scale having a member whose position is governed by the weight upon the scale, computation recording mechanism comprising a differentially movable member having a graduated contact surface to abut said weight-controlled member in its varying positions and a manually-controlled member adjustable with relation to and coöperating with the differentially movable member.

28. The combination with the scale beam of computing weighing scales, of computation recording mechanism comprising a differentially movable type carrying drum having a head with an internal graduated edge or surface bounding an opening through which the scale beam extends, means for moving said drum, and printing mechanism coöperating with the type-carrying drum and adjustable as to its point of coöperation therewith along the drum.

29. The combination with the poise member of computing weighing scales, of computation recording mechanism comprising a differentially movable member having a graduated contact surface to abut said poise member in its varying positions, means for moving said differentially movable member, with provisions for holding fixed the poise member, means coöperating with the differentially movable member and adjustable as to its point of coöperation therewith according to the price per pound of the article being weighed.

30. The combination with the poise member of computing weighing scales, of computation recording mechanism comprising a differentially movable type carrying member having a graduated contact surface to abut said poise member in its varying positions, means for moving said type carrying member, with provisions for holding fixed the poise member, printing mechanism coöperating with the type-carrying member and adjustable as to its point of coöperation therewith according to the price per pound of the commodity being weighed.

31. The combination with the poise member of computing weighing scales, of computation recording mechanism comprising a differentially movable type carrying drum having a graduated contact surface to abut said poise member in its varying positions, means for moving said drum, with provisions for holding fixed the poise member, printing mechanism coöperating with the type on the drum and adjustable longitudinally of the latter according to the price per pound of the article being weighed.

32. The combination with the scale beam of computing weighing scales, of computation recording mechanism comprising a differentially movable member having a graduated contact surface to abut said scale beam in its varying positions, means for moving said differential member, with provisions for holding fixed the scale beam, a member coöperating with the differentially movable member and adjustable with relation thereto according to the price per pound of the article being weighed.

33. The combination with the scale beam of computing weighing scales, of computation recording mechanism comprising a differentially movable type carrying drum having a graduated contact surface to abut said scale beam in its varying positions, means for moving said drum, with provisions for holding fixed the scale beam, a member coöperating with the type-carrying drum and adjustable with relation thereto according to the price per pound of the article being weighed.

34. The combination with the poise member of computing weighing scales, of computation recording mechanism comprising a differentially movable member having the graduated stepped contact surface to abut said poise member in its varying positions, means for moving said differentially movable member, with provisions for holding fixed the poise member, a member coöperating with the differentially movable member and adjustable with relation thereto according to the price per pound of the article being weighed.

35. The combination with the poise member of computing weighing scales, of computation recording mechanism comprising a differentially movable type carrying member having a graduated stepped contact surface to abut said poise member in its varying positions, means for moving said type carrying member, with provisions for holding fixed the poise member, a member coöperating with the differentially movable member and adjustable with relation thereto according to the price per pound of the article being weighed.

36. The combination with the poise member of computing weighing scales, of computation recording mechanism comprising a differentially movable type carrying drum having a graduated stepped contact surface to abut said poise member in its varying positions, means for moving said drum, with provisions for holding fixed the poise member, a member coöperating with the type-carrying drum and adjustable with relation thereto according to the price per pound of the article being weighed.

37. The combination with the scale beam of computing weighing scales, of computation recording mechanism comprising a differentially movable member having a graduated stepped contact surface to abut said scale beam in its varying positions, means for moving said differential member, with provisions for holding fixed the scale beam, a member coöperating with the differentially movable member and adjustable with relation thereto according to the price per pound of the article being weighed.

38. The combination with the scale beam of computing weighing scales, of computation recording mechanism comprising a differentially movable type carrying drum having a graduated stepped contact surface to abut said scale beam in its varying positions, means for moving said drum, with provisions for holding fixed the scale beam, a member coöperating with the type-carrying drum and adjustable with relation thereto according to the price per pound of the article being weighed.

39. The combination with the scale beam of computing weighing scales, of computation recording mechanism comprising a differentially movable type carrying drum having a head with an internal graduated edge or surface bounding an opening through which the scale beam extends, means for moving said drum, with provisions for holding fixed the scale beam, a member coöperating with the type-carrying drum and adjustable with relation thereto according to the price per pound of the article being weighed.

40. The combination with the poise member of computing weighing scales, of computation recording mechanism comprising a differentially movable member having a graduated contact surface to abut said poise member in its varying positions, means for moving said differentially movable member, with provisions for clamping the poise member, a member coöperating with the differentially movable member and adjustable with relation thereto according to the price per pound of the article being weighed.

41. The combination with the poise member of computing weighing scales, of computation recording mechanism comprising a differentially movable type carrying member having a graduated contact surface to abut said poise member in its varying positions, means for moving said type carrying member, with provisions for clamping the poise member, a member coöperating with the differentially movable member and adjustable with relation thereto according to the price per pound of the article being weighed.

42. The combination with the poise member of computing weighing scales, of computation recording mechanism comprising a differentially movable type carrying drum having a graduated contact surface to abut said poise member in its varying positions, means for moving said drum, with provisions for clamping the poise member, a member coöperating with the type-carrying drum and adjustable with relation thereto according to the price per pound of the article being weighed.

43. The combination with the scale beam of computing weighing scales, of computation recording mechanism comprising a differentially movable member having a graduated contact surface to abut said scale beam in its varying positions, means for moving said differential member, with provisions for clamping the scale beam, a member coöperating with the differentially movable member and adjustable with relation thereto according to the price per pound of the article being weighed.

44. The combination with the scale beam of computing weighing scales, of computation recording mechanism comprising a differentially movable type carrying drum having a graduated contact surface to abut said scale beam in its varying positions, means for moving said drum, with provisions for clamping the scale beam, a member coöperating with the type-carrying drum and adjustable with relation thereto according to the price per pound of the article being weighed.

45. The combination with the poise member of computing weighing scales, of computation recording mechanism comprising a differentially movable member having the graduated stepped contact surface to abut said poise member in its varying positions, means for moving said differentially movable member, with provisions for clamping the poise member, a member coöperating with the differentially movable member and adjustable with relation thereto according to the price per pound of the article being weighed.

46. The combination with the poise member of computing weighing scales, of computation recording mechanism comprising a differentially movable type carrying member having a graduated stepped contact surface to abut said poise member in its varying positions, means for moving said type carrying member, with provisions for clamping the poise member, a member coöperating with the differentially movable member and adjustable with relation thereto according to the price per pound of the article being weighed.

47. The combination with the poise member of computing weighing scales, of computation recording mechanism comprising a differentially movable type carrying drum having a graduated stepped contact surface to abut said poise member in its varying positions, means for moving said drum, with provisions for clamping the poise member, a member coöperating with the type-carrying drum and adjustable with relation thereto according to the price per pound of the article being weighed.

48. The combination with the scale beam of computing weighing scales, of computation recording mechanism comprising a differentially movable member having a graduated stepped contact surface to abut said scale beam in its varying positions, means for moving said differential member, with provisions for clamping the scale beam, a member coöperating with the differentially movable member and adjustable with relation thereto according to the price per pound of the article being weighed.

49. The combination with the scale beam of computing weighing scales, of computation recording mechanism comprising a differentially movable type carrying drum having a graduated stepped contact surface to abut said scale beam in its varying positions, means for moving said drum, with provisions for clamping the scale, a member coöperating with the type-carrying drum and adjustable with relation thereto according to the price per pound of the article being weighed.

50. The combination with the scale beam of computing weighing scales, of computation recording mechanism comprising a differentially movable type carrying drum having a head with an internal graduated edge or surface bounding an opening through which the scale beam extends, means for moving said drum, with provisions for clamping the scale beam, a member coöperating with the type-carrying drum and adjustable with relation thereto according to the price per pound of the article being weighed.

51. In an apparatus of the character described, the combination with weighing means and price per unit of weight regulating means, of means for duplicating a printed record of computations comprising a computing printing mechanism having a member differentially controlled in the extent of its movement by the weighing means, and holding and feeding devices for strip and check paper with provisions for more extended advance of the latter than of the former.

52. In an apparatus of the character described, the combination with weighing means and price per unit of weight regulating means, of means for making a continuous record of computations comprising a computation printing mechanism including a member differentially controlled in the extent of its movement by the weighing means, and provisions for duplicating the record on separate checks and differentiated feed for the latter.

53. In an apparatus of the character described, the combination with weighing means and price per unit of weight regulating means, of means for duplicating the printed record of computations on continuous strips comprising a computation printing mechanism including a member differentially controlled in the extent of its movement by the weighing means, and means for automatically severing one strip to produce checks.

54. In an apparatus of the character described, the combination with weighing means, of computation recording mechanism comprising a type carrier controlled in its position by the weighing means and a member coöperating with the type carrier and manually adjustable as to its point of coöperation according to the price per unit of weight of the article being weighed, said member comprising differentiated record and check strip feeding mechanisms, inking means, a platen, and check-severing devices.

55. In an apparatus of the character described, the combination with weighing means, of computation recording mechanism comprising a type carrier controlled by the weighing means and a member coöperating with the type carrier and manually adjustable as to its point of coöperation according to the price per unit of weight of the article being weighed and comprising differentiated record and check strip feeding mechanisms, strips fed thereby, an inking ribbon interposed between said strips, a platen and check severing devices.

56. The combination with weighing scales, of a differentially movable drum controlled thereby and bearing a plurality of circumferential rows of computation type, and an impression mechanism adjustable longitudinally of the drum and into registry with any desired circumferential row of type.

57. The combination with weighing scales, of a differentially movable drum controlled thereby and bearing a plurality of circumferential rows of computation type, and a printing mechanism adjustable longitudinally of the drum, and comprising strip feeding mechanism, inking means, and impression means.

58. The combination with weighing scales, of a differentially movable drum controlled thereby and bearing a plurality of longitudinal rows of computation type, and a printing mechanism adjustable longitudinally of the drum and comprising duplex strip feeding mechanism, inking means, and impression means.

59. The combination with weighing scales, of a differentially movable drum controlled thereby and bearing a plurality of longitudinal rows of computation type, and a printing mechanism adjustable longitudinally of the drum and comprising duplex strip feeding mechanism, inking means, impression means, and strip-severing means.

60. In a scale, the combination with a member whose position is controlled by the weight on the scale, a recording mechanism including a printing drum having a plurality of annular series of numeral type and a paper presenting device, said drum and device having two differential movements with respect to each other, one of said movements controlled in extent by the position of said member and the other of said movements directly controlled by the operator.

61. In a scale, the combination with a member whose position is controlled by the weight on the scale, and recording mechanism including a printing drum having a plurality of annular series of numeral type and a paper presenting device, the printing drum having a rotary movement and the printing device a movement longitudinally of the drum, one of such movements being controlled by the position of the scale member and the other by the operator.

62. In an apparatus of the character described, the combination with weighing means or price recording mechanism comprising a pivoted type carrying cylinder controlled as to its pivotal movement by the weighing means and having a plurality of circumferential rows of price printing types, said rows corresponding respectively to different rates per unit of weight, of means movable longitudinally of the cylinder to selectively coöperate with any one of the rows of type and carrying a platen and inking and paper supplying means arranged for coöperation with certain of the type of the row selected.

ALLEN DE VILBISS, Jr.

Witnesses:
FRANK PARKER DAVIS,
LOUIS B. ERWIN.

Copies of this patent may be obtained for five cents each, by addressing the "Commissioner of Patents, Washington, D. C."